US005307994A

United States Patent [19]

Hieronymus

[11] Patent Number: 5,307,994

[45] Date of Patent: May 3, 1994

[54] DRIPLESS SPRAY GUN VENT AND RESERVOIR ASSEMBLY FOR SYPHON-CUP PAINT SPRAY GUN

[76] Inventor: John R. Hieronymus, 4234 Industrial Pl., Island Park, N.Y. 11558

[21] Appl. No.: 72,889

[22] Filed: Jun. 4, 1993

[51] Int. Cl.[5] .......................... F16K 24/04; B05B 7/30

[52] U.S. Cl. .................................... 239/340; 239/526; 137/587

[58] Field of Search ................ 239/340, 347; 137/587, 137/592, 897

[56] References Cited

U.S. PATENT DOCUMENTS

| | | | |
|---|---|---|---|
| 538,967 | 5/1895 | Hugershoff | 239/121 |
| 4,174,070 | 11/1979 | Lau et al. | 239/347 X |
| 4,825,905 | 5/1989 | Whitely | 137/587 |
| 4,832,232 | 5/1989 | Broccoli | 239/318 X |
| 4,921,071 | 5/1990 | Lonnborg et al. | 137/587 X |

*Primary Examiner*—Andres Kashnikow
*Assistant Examiner*—Kevin P. Weldon
*Attorney, Agent, or Firm*—Galgano & Burke

[57] ABSTRACT

An improved syphon-cup paint spray gun assembly includes a spray paint gun and an associated cup container for paint having a cover and a syphon tube extending through the cover for drawing paint from the container through the tube and to the spray gun for discharge therefrom, the cover having a vent formed therethrough and an overflow reservoir connected with the vent exteriorly of the container for preventing passage of paint through the vent to the exterior of the assembly upon manipulation of the assembly by an operator thereof into a position wherein the paint contacts the vent and would otherwise flow through the vent and drip from the assembly. The overflow reservoir is mounted on the cover and includes a generally cup-shaped base defining an overflow chamber communicating with the lower vent and a removable cap attached to the base having a vent formed therethrough offset from the cover vent.

10 Claims, 3 Drawing Sheets

DRIPLESS SPRAY GUN VENT AND RESERVOIR ASSEMBLY FOR SYPHON-CUP PAINT SPRAY GUN

BACKGROUND OF THE INVENTION

1. Field of the Invention

The present invention relates to a an improved spray gun, of the syphon-cup type. More particularly, it relates to such a spray gun having a vented fluid supply container and means connected with the vent for preventing dripping of fluid therefrom upon use and movement of the gun.

2. The Prior Art

In the use of syphon-cup type paint spray guns, paint is syphoned through a tube from a supply container into an air stream, passing through the gun for discharge in a spray from an orifice in a nozzle of the gun. Since during spray the volume of paint within the container decreases, the container is vented to atmosphere to prevent a negative pressure from developing therein, with the resultant failure of paint to be syphoned into the gun. With such spray guns, paint within the container may pass through the vent and drip therefrom upon manipulation of the gun. Such dripping is not only undesirable, but is intolerable when it falls upon and mars an otherwise smooth, painted surface.

Various spray gun assemblies have been proposed to overcome this problem. For example, U.S. Pat. No. 4,174,070, granted to Lau et al, discloses an improved, syphon-type spray gun assembly including a spray gun and an associated supply container having a vent to atmosphere, which is characterized by means for preventing dripping from the assembly of contents of the container which pass through the vent. The means for preventing comprises a U-shaped tube, the first end of which communicates with the vent, and the second end of which is disposed in a position remote from the vent. While the device affords an improvement over a simple vent, dripping through the U-shaped tube can still occur, especially during tilting and shaking of the syphon cup to keep the paint in a thoroughly mixed state. This is often necessary between paint applications, since during the drying period when the paint spray assembly is not used, the paint may settle. Instead of using a mixing stick, which requires opening of the syphon cup, the operator will often simply place his thumb over the vent and shake the gun and cup to mix the paint. Upon release of the operator's thumb from the vent, gas build up will cause paint to squirt out of the vent.

U.S. Pat. No. 3,714,967, to Zupan et al, discloses a syphon paint spray cup assembly which provides an angularly-disposed, elongated vent passageway and reservoir in the cup cover to limit paint drip. However, the reservoir is not sufficient to contain the paint and prevent its dripping during shaking of the paint spray cup by the operator.

U.S. Pat. No. 4,405,088, to Gray, discloses an adaptor for syphon-type spray paint guns, which is provided with an internal- and external-type vent tube, however, once again, this device does not completely prevent dripping following shaking.

Finally, U.S. Pat. No. 4,832,232, to Broccoli, discloses a spray gun vent but for a pressure-type spray gun, which provides an external reservoir. However, the same does not allow for the paint to easily flow back into the container following venting and it is not intended for use with a syphon-type spray gun.

SUMMARY OF THE INVENTION

Accordingly, it is an object of the present invention to provide an improved syphon-cup type spray gun assembly which eliminates dripping of fluid from a vented supply container.

It is a further object of the present invention to provide such a novel, improved syphon-cup type spray gun assembly which is relatively simple in design, easy to use and dripless in operation.

It is yet a further object of the present invention to provide such an improved syphon-cup type spray gun assembly which may be readily adaptable to existing syphon-cup spray gun assemblies.

Certain of the foregoing and related objects are readily attained in an improved syphon-cup paint spray gun assembly of the type including a spray paint gun and an associated cup container for paint having a cover and a syphon tube extending through the cover for drawing paint from the container through the tube and to the spray gun for discharge therefrom. The cover has a vent formed therethrough and means connected with the vent exteriorly of the container for preventing passage of paint through the vent to the exterior of the assembly upon manipulation of the assembly by an operator thereof into a position wherein the paint contacts the vent and would otherwise flow through the vent and drip from the assembly. The means for preventing includes an overflow reservoir mounted on the cover including a generally cup-shaped base defining an overflow chamber communicating with the cover vent and a removable cap attached to the base having a vent formed therethrough offset from the cover vent.

Preferably, the overflow chamber has a downwardly-sloping base wall, the lowermost portion of which is in communication with the cover vent. Most advantageously, both the cap vent and the cover vent each has a downwardly-directed, nozzle-like lower opening. Most desirably, the removable cap is attached to the cup-shaped hose via snap-fit connection means. It is further preferable that the removable cap is made of plastic.

In a preferred embodiment of the invention, the overflow reservoir is demountably attached demountably to the cover. The base of the overflow reservoir desirably has a downwardly-directed, tubular extension insertable through the cover, which tubular extension has a throughbore with an upper open end communicating with the overflow chamber and a lower open end communicating with the container, the throughbore serving as said "cover vent". Most desirably, the tubular extension has a lower end portion and lock nut means associated thereof for demountably attaching the overflow reservoir to the cover. The lock nut means advantageously includes a lock nut washer received on the tubular extension immediately above the cover and a gasket received on the tubular extension immediately below the cover.

Finally, in a particularly preferred embodiment of the invention, the overflow reservoir is laterally offset and disposed generally outwardly relative to the cover via a lateral extension of the base having a throughbore interconnecting the overflow reservoir and the tubular extension throughbore.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

In the drawings, wherein similar reference characters denote similar elements throughout the several views.

DESCRIPTION OF THE PREFERRED EMBODIMENTS

Figure 1:
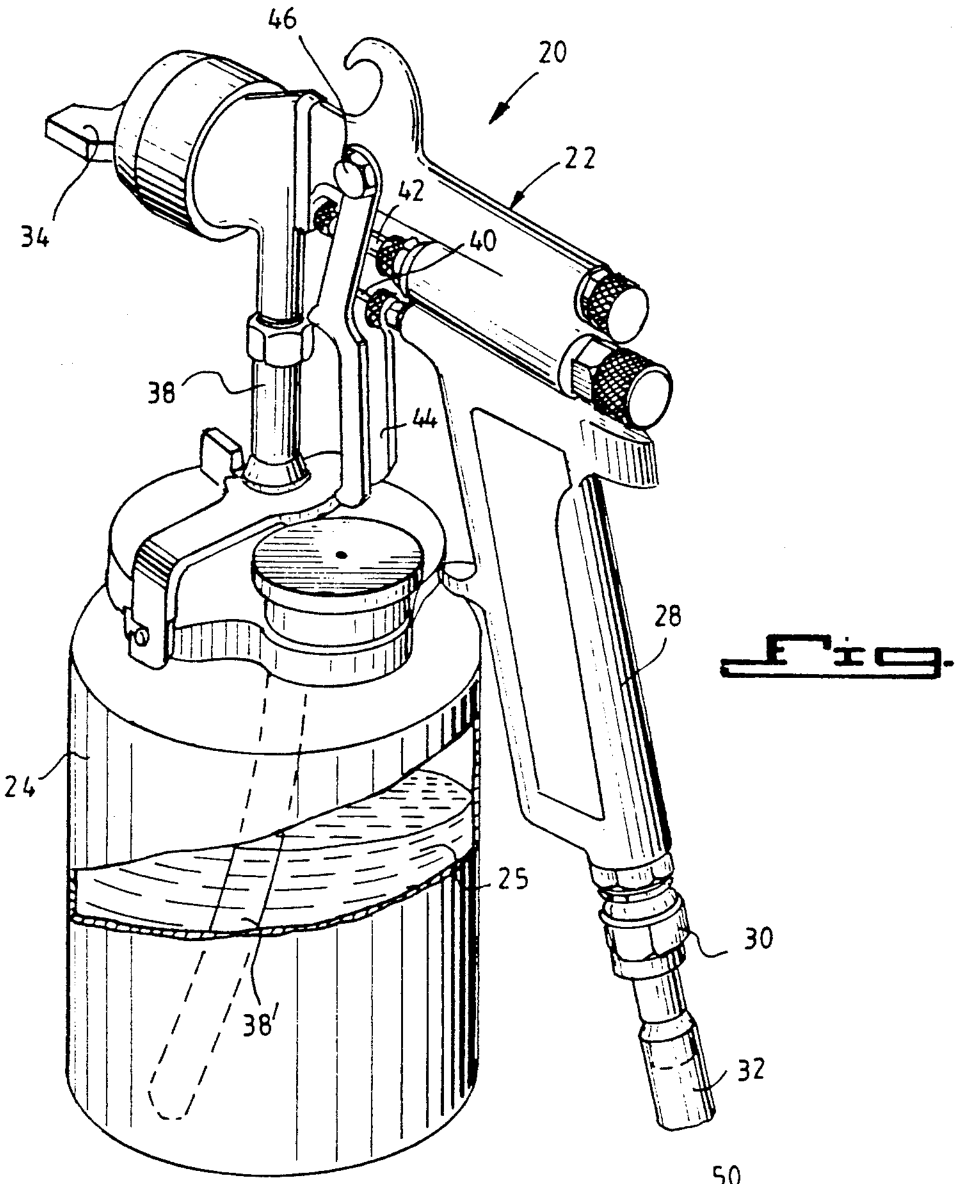
FIG. 1 is a perspective view of a syphon-cup type spray gun assembly embodying the present invention with portions broken away and, in part, in phantom line, to show internal construction.
Figure 3:
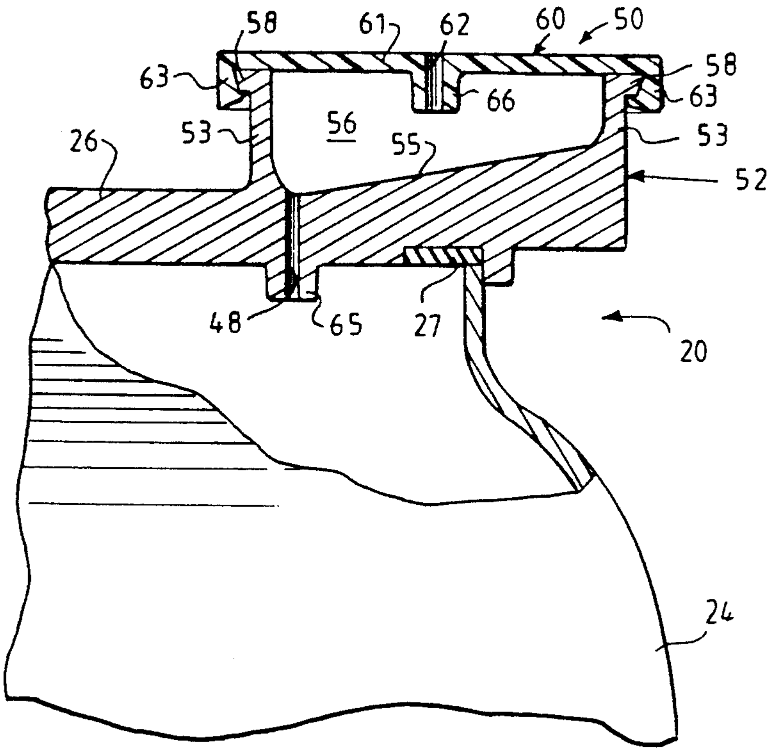
FIG. 3 is a side sectional view, in part elevation, of the spray gun vent and reservoir assembly.

Referring to FIG. 1 of the drawings, therein is illustrated, in accordance with one embodiment of the invention, is a syphon-cup type paint spray gun assembly, indicated generally at 20, including a spray gun 22, a container 24, which normally contains a supply of paint 25 therein, and a top closure lid 26, which substantially closes the upper end of the container 24, with the aid of a seal 27 (see FIG. 3). The gun 22 includes a handle 28, connected at a lower end thereof with a source of compressed air (not shown) through a fitting 30 and a supply line 32, and a nozzle 34 having a orifice from which paint 25 drawn from the container 24 through a syphon tube 38 is emitted in a spray. The tube 38 has a lower extension 38' projecting into the container 24 adjacent the bottom thereof, and upon passage of air past an upper end thereof within the gun, paint 25 is drawn therethrough and into the gun by Venturi effect. To control this rapid spraying operation, the gun includes a valve means 40 movable between open and closed positions to control a flow of pressurized air through the gun 22, a valve means 42 movable between open and closed positions to control a flow of paint 25 to the orifice, and a manually manipulable trigger 44 operably connected with the valve means 40 and 42. The trigger is pivotably mounted at its upper end by a pivot pin 46 and is manually movable between a "gun-off" position away from the handle 28, at which the valve means are closed, to a "gun-on" position toward the handle, at which the valve means 40, 42 are open and a spray of paint is emitted from the gun 22.

The assembly thus far described is known in the art (see, e.g., U.S. Pat. No. 4,174,070, the subject matter of which is incorporated herein by reference thereto), and when operated in a known manner, the container 24 is vented to atmosphere, as by a vent passage formed through the lid 26. The vent opens the container to prevent a negative pressure from developing therewithin as paint is drawn through the syphon tube 38', which negative pressure would otherwise ultimately stop the syphoning action. In the use of such a spray gun, it often occurs that paint flows, or passes through, the vent and drips therefrom during manipulation of the gun by an operator, which dripping can mar an otherwise smoothly-painted surface. Also, the paint spillover will require cleaning of the spray gun assembly, which is time-consuming.

Figure 2:
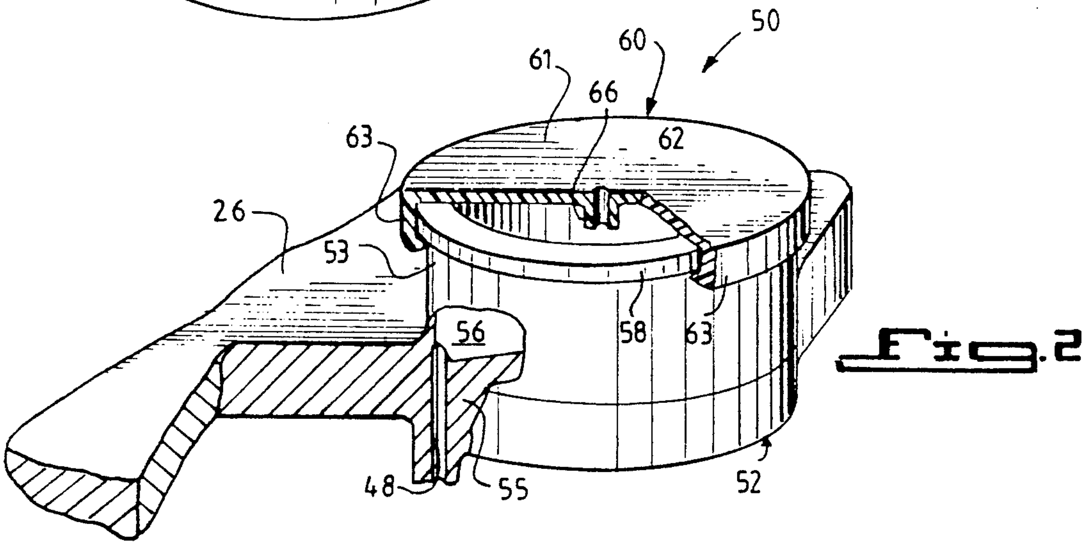
FIG. 2 is an enlarged, fragmentarily-illustrated view of the dripless spray gun vent and reservoir assembly of the present invention, with portions broken away to show internal construction.

According to the present invention, the improved spray gun assembly eliminates undesirable dripping of paint from the cover vent 48 by the provision of an overflow reservoir, generally designated 50 which, as seen best in FIGS. 2 and 3, includes a generally cup-shaped base 52 formed integrally with the lid 26 and including a cylindrical sidewall 53 joined by a base wall 55, which together define an overflow chamber 56. The bottom wall 55 of the base 52 slopes downwardly towards the base of wall 53, where it opens onto vent 48 in lid 26. The upper end of sidewall 53 is provided with outwardly extending annular flange 58. A removable plastic cap, generally designated 60, is demountably secured to base 52. Cap 60 has a central, circular, planar, disc-like element 61, which has a centrally-disposed vent or vent hole 62 formed therethrough. The outer periphery of disc-shaped wall 61 is provided with downwardly-depending, peripherally extending annular flanges 63 having hook-shaped ends, which snap over flange 58 of base 52. Lid 26 is provided with a downwardly-directed, nozzle-like lower opening 65 for vent 48, and, similarly, cap 60 is provided with a downwardly-directed, nozzle-like lower opening 66 for vent 62.

Figure 4:
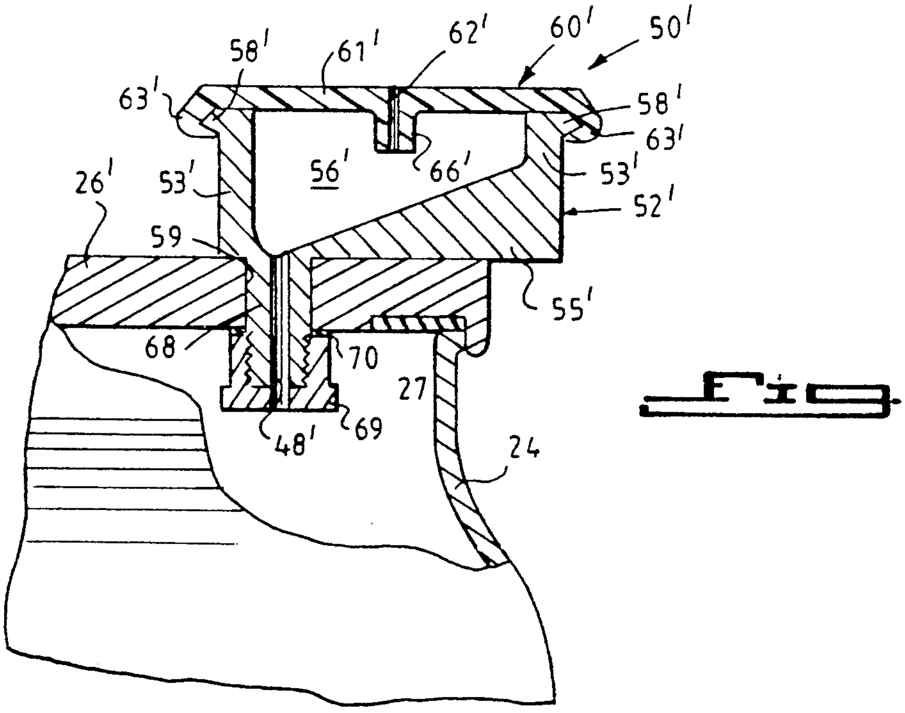
FIG. 4 is a side sectional view, in part elevation, of an alternate embodiment of the dripless spray gun vent and reservoir assembly.

FIG. 4 discloses an alternate embodiment wherein the overflow reservoir 50' is demountably mounted on lid 26; this embodiment being suitable for retrofitting conventional, syphon-cup type spray gun assemblies. This embodiment also facilitates removal of the reservoir to allow for easy cleaning thereof. The construction of the reservoir 50' is substantially the same as the main embodiment, and similar elements have been given similar reference numerals except for the addition of a prime. The main difference is that lid 26 is provided with a larger throughbore 59 in place of vent 48 to allow a downwardly-directed tubular extension 68 of reservoir base 52' to be insertable through the lid 26. The tubular extension 68 has a throughbore 48', with an upper open end communicating with the overflow chamber 56' and a lower open end communicating with the container chamber; the vent opening 48' replaces the original cover vent 48. Tubular extension 68 has a threaded lower end portion, and a lock nut 69 with a gasket 70 is received thereon for locking the reservoir 50' onto lid 26. In this embodiment, the resilient plastic cap or cover 60, is provided with a peripherally-depending annular flange 63', which is provided with a triangular undercut section which, in turn, mates with a complimentary-configured triangular annular flange 58' on the upper end of sidewall 53' to provide a snap fit engagement of cap 60' on base 52'.

Figure 5:
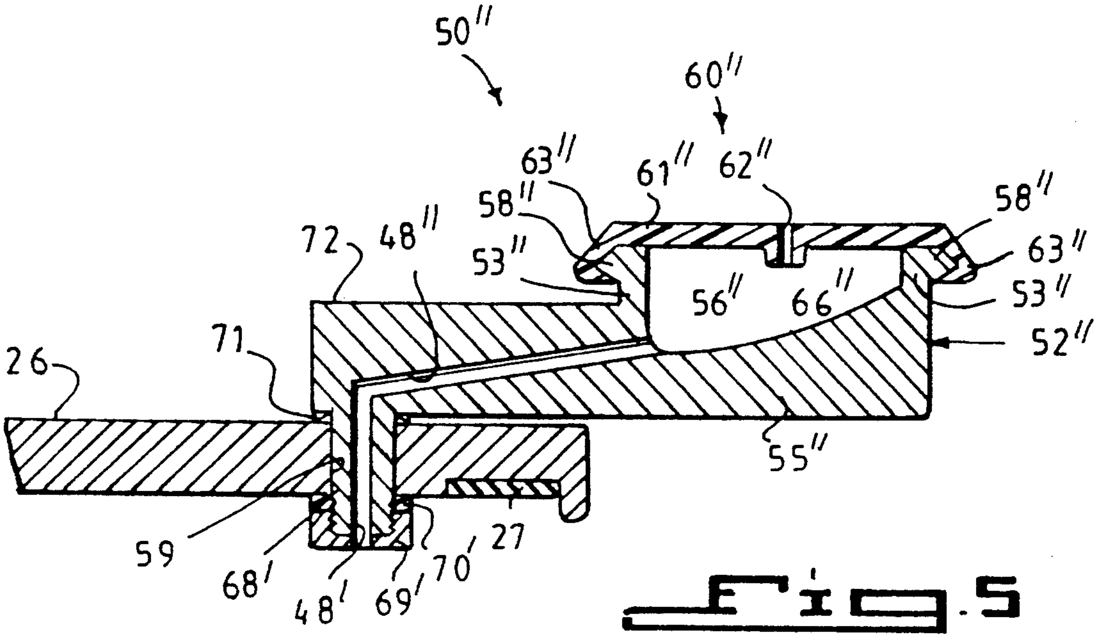
FIG. 5 is a side sectional view, showing a further alternate embodiment of the dripless spray gun vent and reservoir assembly.
Figure 6:
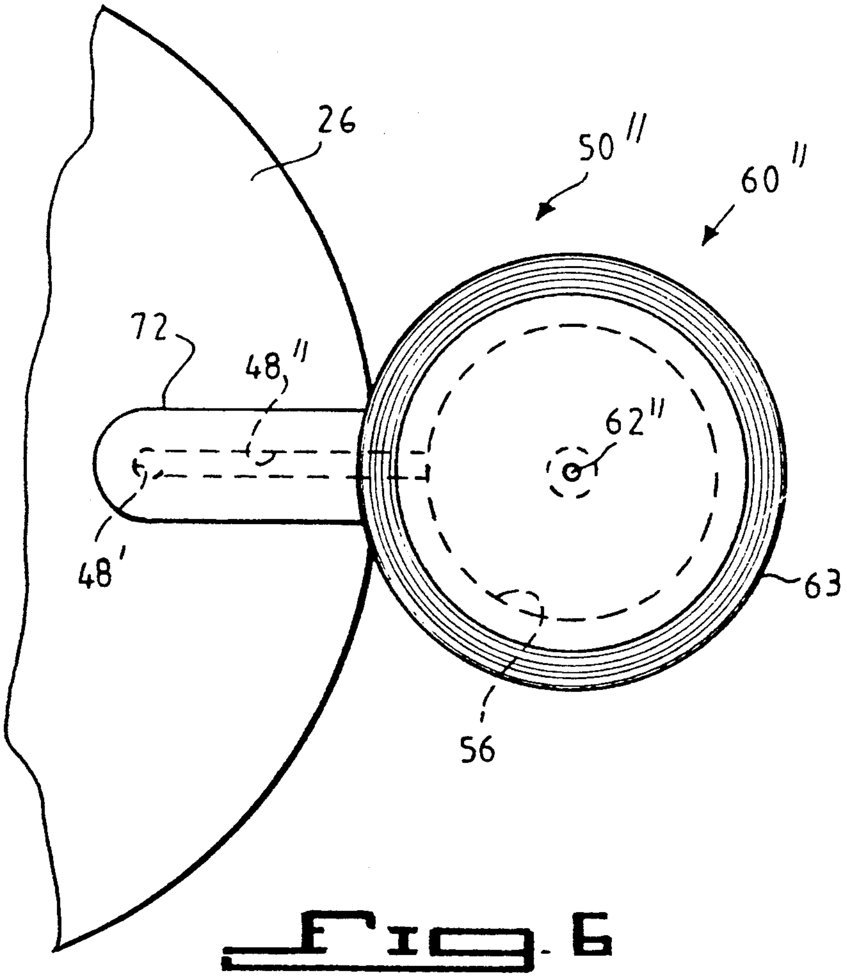
FIG. 6 is a top elevational view of the embodiment shown in FIG. 5.

FIGS. 5 and 6 illustrated an alternate embodiment of the removable-type overflow reservoir wherein the reservoir 60" is laterally offset and disposed generally radially outwardly, relative to the cover 26, via a lateral extension 72 of base 52"; again, similar elements are provided with similar reference numerals, except for the addition of a prime or double prime with respect to the pertinent embodiment. Lateral extension 72 is provided with a throughbore 48" interconnecting overflow reservoir 56" and the tubular extension throughbore 48'. A star-lock washer 71 is fitted on the lower, downwardly-directed tubular extension 68" such that it is disposed between cover 26 and lateral extension 72 to enhance the locking effect and hold the reservoir in the desired position.

When using the spray gun with the overflow reservoir according to the invention, the possibility of paint dripping from the spray vent is significantly minimized, due to a number of factors. First of all, the downwardly-depending nozzle-like extensions of vents 48, 48' and 62, 62' serves to minimize the possibility that paint will leave the cup 24 and overflow chambers 56, 56', 56", even when the gun 22 is held in a tilted position, as normally used, for example, in automotive painting; the nozzle-like lower ends 48, 48', 62, 62' serving as an exit barrier. Furthermore, the reservoir chambers 56, 56', 56", with their downwardly-sloped bottom walls 55, 55', 55", serves to direct any paint therein directly back through the vent hole 48, 48' and into the cup or container 24. In addition, due to the rather large size of the reservoirs 50, 50', 50" in comparison to the vent holes 48, 48', paint can build up in the reservoir chambers 56, 56', 56" for a significantly longer period of operation, without causing the same to drip out the end of the cap vent 62, 62', 62". The cap vent 62, 62', 62" is also axially offset with respect to the cover vent 48, 48', so as to also minimize the possibility of venting of paint 25 through the cap 60, 60', 60" and cover 26. As can be appreciated, the lid 61, 61', 61" can be easily removed to allow for easy cleaning of the overflow reservoir. With the embodiments of FIGS. 4–6, the lock washer 69, 69' can be removed so as to allow for disassembly of the overflow reservoir 50' 50" and to allow for cleaning of the same in a more effective manner.

The present invention, with overflow reservoir 50, 50', 50", also allows the spray applicator, such as a painter of automobiles, the ability to hold a thumb over the conveniently-located cap vent 62, 62', 62" in order to enable the operator to shake the gun and keep paint mixed in the cup while painting. Paint will not enter the reservoir as long as the cap vent 62, 62', 62" is covered, as pressure will build up in the cup while shaking. When the thumb is removed from the cap vent 62, 62', 62", air will flow out of the lid vent 48, 48', and as the air flows out through the reservoir chamber 56, 56', 56" toward the cap vent 62, 62', 62", it will pull paint in a syphoning action toward the cap vent. However, with the cap vent hole 62, 62', 62" being protected by its lower-depending nozzle 66, 66', 66", paint going through the cap vent will be almost entirely, if not completely, eliminated. Any paint entering the overflow chamber 56, 56', 56" through the lid vent 48, 48' will be drawn back into the cup 24 as soon as painting begins. While painting, paint will not enter the reservoir 50, 50', 50" unless the gun 22 is turned to an angle such that the paint would cover the lid vent 48, 48", and only if the gun trigger is released.

While only several embodiments of the invention have been described and illustrated, various modifications and changes may be made thereunto, as will be apparent to those skilled in the art. For example, although a snap-lid type cover is provided for the overflow reservoir, a screw-on cap or other type of attachments could be used for the lid. In addition, the dimensions and configurations of the overflow reservoir can, of course, be modified to suit a particular gun and application.

Accordingly, while only several embodiments of the present invention have been shown and described, it is to be understood that many changes and modifications may be made thereunto without departing from the spirit and scope of the invention as disclosed herein.

What is claimed is:

1. In an improved syphon-cup paint spray gun assembly of the type including a spray paint gun and an associated cup container for paint having a cover and a syphon tube extending through said cover for drawing paint from said container through said tube and to said spray gun for discharge therefrom, said cover having a vent formed therethrough and means connected with said vent exteriorly of said container for preventing passage of paint through said vent to the exterior of said assembly upon manipulation of said assembly by an operator thereof into a position wherein the paint contacts said vent and would otherwise flow through said vent and drip from said assembly, the improvement comprising:

said means for preventing including an overflow reservoir mounted on said cover including a generally cup-shaped base defining an overflow chamber communicating with said lower vent and a removable cap attached to said base having a vent formed therethrough offset from said cover vent, said overflow chamber having a downwardly-sloping base wall, the lowermost portion of which is in communication with said cover vent.

2. The assembly of claim 1, wherein said cap vent has a downwardly-directed, nozzle-like lower opening.

3. The assembly of claim 1, wherein said cover vent has a downwardly-directed, nozzle-like lower opening.

4. The assembly of claim 1, wherein said removable cap is attached to said cup-shaped hose via snap-fit connection means.

5. The assembly of claim 4, wherein said removable cap is made of plastic.

6. The assembly of claim 1, wherein said overflow reservoir is demountably attached to said cover.

7. The assembly of claim 6, wherein said base of said overflow reservoir has a downwardly-directed, tubular extension insertable through said cover, which tubular extension has a throughbore with an upper open end communicating with said overflow chamber and a lower open end with said container, said throughbore serving as said cover vent.

8. The assembly of claim 6, wherein said tubular extension has a lower end portion and lock nut means associated thereof for demountably attaching said overflow reservoir to said cover.

9. The assembly of claim 8, wherein said lock nut means includes a lock nut washer received on said tubular extension immediately above said cover and a gasket received on said tubular extension immediately below said cover.

10. The assembly of claim 8, wherein said overflow reservoir is laterally offset and disposed generally outwardly relative to said cover via a lateral extension of said base having a throughbore interconnecting said overflow reservoir and said tubular extension throughbore.

* * * * *